(No Model.)

C. W. MARK.
ILLUMINATING TILE.

No. 456,045. Patented July 14, 1891.

WITNESSES:
J. H. Thieberath
C. Sedgwick

INVENTOR:
C. W. Mark
BY Munn & Co
ATTORNEYS

UNITED STATES PATENT OFFICE.

CHARLES W. MARK, OF NEW YORK, N. Y.

ILLUMINATING-TILE.

SPECIFICATION forming part of Letters Patent No. 456,045, dated July 14, 1891.

Application filed April 4, 1891. Serial No. 387,603. (No model.)

*To all whom it may concern:*

Be it known that I, CHARLES W. MARK, of the city, county, and State of New York, have invented a new and Improved Illuminating-Tile, of which the following is a full, clear, and exact description.

My invention relates to improvements in illuminating-tiles or vault-lights, such as are used in sidewalks, roofs, and similar places;
and the object of my invention is to produce a lens for the tile which will not become easily obscured by dirt and which will be capable of diffusing a great amount of light.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1:
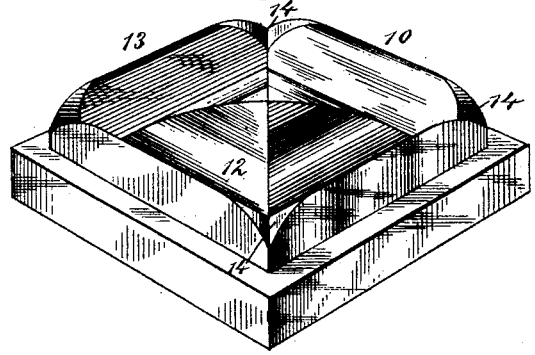
Figure 2:
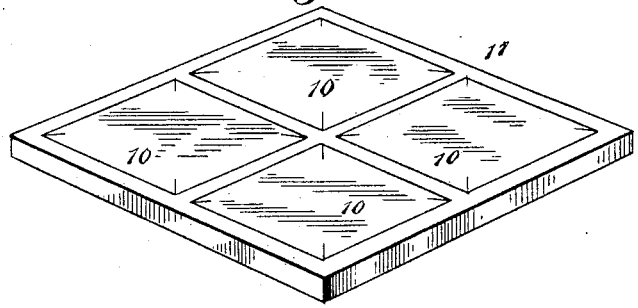
Figure 3:
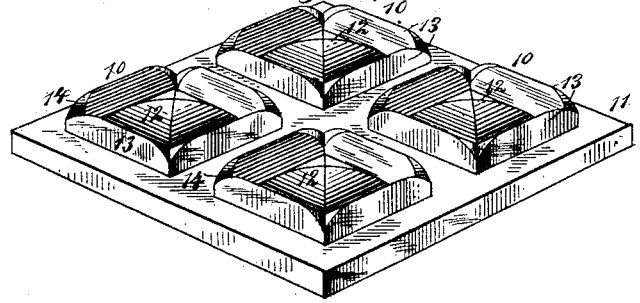
Figure 4:
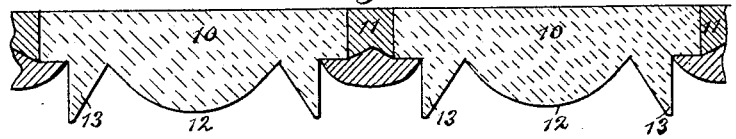

Figure 1 is an inverted detail perspective view of the lens used in the illuminating-tile. Fig. 2 is a top perspective view of several of the lenses secured in a common form of frame. Fig. 3 is an inverted perspective view of the same, and Fig. 4 is a cross-section through the frame and lenses.

The lens 10 is adapted to rest in a frame 11, and it may be secured therein in any convenient way. In the drawings the lens is shown as square and as having a plane or flat upper surface; but the general shape of the lens is immaterial, and its upper surface may be flat or oval, if desired, as the features of my invention are in the construction of the under surface of the lens.

A bull's-eye 12 is produced centrally on the under portion of the lens, and as shown in the drawings the sides of the bull's-eye are slightly flattened; but, if desired, the bull's-eye may be made hemispherical. On each side of the bull's-eye is a depending lip or lug 13, the lugs being arranged at right angles and provided with vertical outer sides and with inclined inner sides; but the inclination may be reversed, if desired, without departing from the principle of my invention.

At the corners of the central portion of the lens where the lugs 13 meet they are cut away, as shown at 14, to provide for a greater diffusion of light. The lenses are secured in the frame 11 with the lugs and bull's-eye pointing downward, and the light as it passes through the lenses will be directed downward by the bull's-eyes, and portions of the light will be deflected sidewise in all directions by the various lugs 13, and it will thus be seen that each lens will have great powers of refraction and diffusion and will shed a great deal of light in proportion to its size. It will be noticed, too, that the projecting lugs and bull's-eyes will not be readily covered by dirt, and if the crevices between the projecting portions are partially obscured still there will enough light pass downward through the projecting parts to illuminate the space beneath them.

Having thus fully described my invention, I claim as new and desire to secure by Letters Patent—

1. In illuminating-tiles, a lens having on one side a central bull's-eye with flattened sides and having a series of inclined lugs arranged at right angles to each other around the bull's-eye, substantially as described.

2. In illuminating-tiles, a lens having on its under side a central bull's-eye and having a series of inclined lugs encircling the bull's-eye and arranged at right angles to each other, the lugs being cut away at their adjacent ends, substantially as shown and described.

CHARLES W. MARK.

Witnesses:
WARREN B. HUTCHINSON,
E. M. CLARK.